United States Patent
Luo et al.

(10) Patent No.: US 11,232,619 B2
(45) Date of Patent: Jan. 25, 2022

(54) INTERACTIVE GRAPHIC RENDERING METHOD AND APPARATUS, AND COMPUTER STORAGE MEDIUM

(71) Applicant: Tencent Technology (Shenzhen) Company Limited, Shenzhen (CN)

(72) Inventors: Cheng Luo, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 117 days.

(21) Appl. No.: 16/555,345

(22) Filed: Aug. 29, 2019

(65) Prior Publication Data

US 2019/0385351 A1 Dec. 19, 2019

Related U.S. Application Data

(63) Continuation of application No. PCT/CN2018/100313, filed on Aug. 14, 2018.

(30) Foreign Application Priority Data

Aug. 15, 2017 (CN) .......................... 201710697757.4

(51) Int. Cl.
*G06T 15/00* (2011.01)
*G06T 13/40* (2011.01)
(Continued)

(52) U.S. Cl.
CPC .............. *G06T 13/40* (2013.01); *G06T 15/00* (2013.01); *G06T 17/00* (2013.01); *G06T 19/006* (2013.01); *G06T 19/20* (2013.01)

(58) Field of Classification Search
CPC .......... G06T 9/00; G06T 13/00; G06T 13/20; G06T 13/40; G06T 15/00; G06T 15/005;
(Continued)

(56) References Cited

U.S. PATENT DOCUMENTS

| | | | |
|---|---|---|---|
| 2005/0108215 A1* | 5/2005 | Thomas | ................ G06T 15/005 |
| 2008/0052618 A1* | 2/2008 | McMillan | ............... G06T 17/00 |
| | | | 715/249 |

(Continued)

FOREIGN PATENT DOCUMENTS

| | | |
|---|---|---|
| CN | 106204698 A | 12/2016 |
| CN | 107204031 A | 9/2017 |
| CN | 109410299 A | 3/2019 |

OTHER PUBLICATIONS

International Search Report, issued in International Application No. PCT/CN2018/100313, dated Nov. 16, 2018, pp. 1-2, State Intellectual Property Office of the P.R. China, Beijing, China.

*Primary Examiner* — Yanna Wu
(74) *Attorney, Agent, or Firm* — Crowell & Moring

(57) ABSTRACT

An apparatus may obtain, by a processor, target object data formatted based on a first format. The target object data may include a plurality of element resources for a three dimensional model. The first format comprising a file format for transmission of three-dimensional model data. The apparatus may obtain, by the processor, configuration information associated with the target object data. The apparatus may generate, by the processor, a data packet of a second format based on the target object data and the configuration information. The apparatus may provide, by the processor, the data packet to a terminal device.

17 Claims, 10 Drawing Sheets

---

Obtain target object data of a first format, and obtain configuration information of the target object data — 10

Generate a data packet of a second format based on the target object data and the configuration information, and provide the data packet to a terminal device — 20

(51) Int. Cl.
  *G06T 17/00* (2006.01)
  *G06T 19/00* (2011.01)
  *G06T 19/20* (2011.01)
(58) Field of Classification Search
  CPC ....... G06T 17/00; G06T 19/006; G06T 19/20; G06T 2200/16
  USPC .......................................................... 345/473
  See application file for complete search history.

(56) References Cited

U.S. PATENT DOCUMENTS

| | | | |
|---|---|---|---|
| 2010/0158099 A1* | 6/2010 | Kalva | H04N 21/8543 375/240.01 |
| 2013/0093776 A1* | 4/2013 | Chakraborty | G06F 9/45558 345/520 |
| 2014/0267244 A1 | 9/2014 | Ambroziak | |
| 2015/0248503 A1* | 9/2015 | Glunz | G06F 30/00 703/1 |
| 2015/0251095 A1* | 9/2015 | Perrin | G06F 9/452 463/31 |
| 2016/0267699 A1* | 9/2016 | Borke | G06F 3/011 |
| 2017/0200305 A1* | 7/2017 | Oddo | G06T 17/00 |
| 2017/0312634 A1* | 11/2017 | Ledoux | G06T 15/005 |
| 2020/0043505 A1* | 2/2020 | Chinen | H04S 7/00 |

\* cited by examiner

INTERACTIVE GRAPHIC RENDERING METHOD AND APPARATUS, AND COMPUTER STORAGE MEDIUM

CROSS REFERENCE TO RELATED APPLICATIONS

This application is a continuation of International Application PCT/CN2018/100313, filed Aug. 14, 2018, entitled INFORMATION PROCESSING METHOD AND APPARATUS, AND COMPUTER STORAGE MEDIUM, which claims priority to Chinese Patent Application No. 201710697757.4, filed on Aug. 15, 2017, both of which are incorporated herein by reference in their entireties.

TECHNICAL FIELD

This application relates to computer rendering, and specifically, to computer rendering of interactive objects.

BACKGROUND

With the rapid development of Internet applications, various applications come forth. A object visible in an application (for example, an avatar rendering in the application) is usually a two-dimensional object. Development of three dimensional visual data and applications often require separate skills and technical expertise. Applications with integrated three-dimensional data is integrated may is long and resource intensive.

SUMMARY

Aspects of the present disclosure provide various methods and apparatuses, and computer storage mediums, and systems By way of introductory example, a first aspect of the present disclosure may include a computer-implemented method, such as a method implemented by a server. The method may include obtaining, by a processor, target object data formatted based on a first format. The target object data may include a plurality of element resources for a three dimensional model. The first format may include a file format for transmission of three-dimensional model data. The method may further include obtaining, by the processor, configuration information associated with the target object data. The method may further include generating, by the processor, a data packet of a second format based on the target object data and the configuration information. The method may further include providing, by the processor, the data packet to a terminal device. The method may further include obtaining configuration information associated with the target object data. The method may further include generating a data packet of a second format based on the target object data and the configuration information. The method may further include providing the data packet to a terminal device.

A second aspect of the present disclosure may include a computer-implemented method, such as a method implemented by a terminal device. The method may include drawing, by the terminal device, a first image layer corresponding to an application program. The method may further include calling, by the terminal device, a first data packet concurrent with execution of a running instruction of an application program. The method may further include drawing, by the terminal device, concurrent with execution of the application program and drawing of the first image layer corresponding to the application program, a second image layer comprising a target object based on the first data packet and a preset display attribute, the preset display attribute positioned in the second image layer separate from the target object in the second image layer. The method may further include rendering, by the terminal device, image data comprising the first image layer and the second image layer, the second image layer covering the first image layer. The method may further include detecting, by the terminal device, a first operation event for the target object. The method may further include executing, by the terminal device, a first operation instruction included in the first data packet to cause the target object to move.

A third aspect of the present disclosure may include a non-transitory computer readable storage medium. The non-transitory computer readable storage medium may include instructions executable by a processor. The instruction may cause the processor to obtain target object data formatted based on a first format, the target object data comprising a plurality of element resources for a three dimensional model, the first format being a file format for transmission of three-dimensional model data. The instructions may further cause the processor to obtain configuration information associated with the target object data. The instructions may further cause the processor to generate a data packet of a second format based on the target object data and the configuration information. The instructions may further cause the processor to provide the data packet to a terminal device.

Additional or alternative aspects are provided in the present disclosure.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A target object in an existing application (the target object is, for example, an avatar in the application) is usually a two-dimensional object, and a three-dimensional object rarely occurs. This is because application development and three-dimensional object development are separately used as an independent development category, and each needs corresponding development conditions and development skills, and a requirement that has both the two development conditions and development skills is relatively high, the development is difficult, and the development period is long.

An example of a technical advancement achieved by the systems, methods, and devices described herein is that a three-dimensional model manufacturer may develop and manufacture a data packet for a user to obtain and call, without the user having advanced development expertise to integrate a target object with the display content of an application program. The data packet, being developed by a professional three-dimensional model developer, may generate and cause the target object to be displayed. The data packet may further cause changes to the displayed object in response to interactive input. Thus, the development threshold for integrating interactive three-dimensional content with applications is significantly reduce.

Figure 1A:
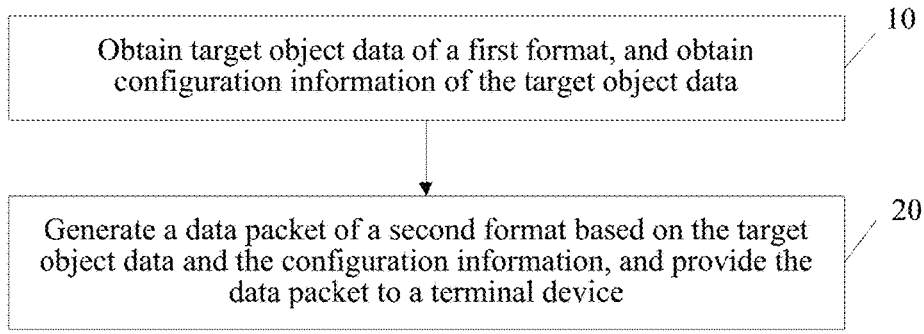
FIG. 1a is a schematic flowchart of an information processing method according to an embodiment of this application.

FIG. 1a is a schematic flowchart of an information processing method according to an embodiment of this application. The method may be executed by a computing device. The computing device may be a terminal device, or a device in a platform that provides a particular online service, such as a server. As shown in FIG. 1a, the method may include the following steps.

Step 10: Obtain target object data of a first format, and obtain configuration information of the target object data.

The target object is a three-dimensional model, the target object data includes data of a plurality of element resources, and the first format is a file format supporting transmission of three-dimensional model data.

Step 20: Generate a data packet of a second format based on the target object data and the configuration information, and provide the data packet to a terminal device.

In each embodiment, the element resources may be components that constitute the target object. When the target object is an avatar object, the element resources may include body, portions of a body, hair, clothes, and the like that constitute the avatar object, and are denoted as body element resources, hair element resources, clothes element resources, and the like.

In each embodiment, the first format is any file format supporting transmission of three-dimensional model data, for example, a DAE format, an FBX format, or an OBJ format.

In each embodiment, the configuration information of the target object data may include one type of the following information: the number and formats of target objects; version information, and data set for a customization requirement of the target object (such as a customizable attribute of each element of the three-dimensional model).

The first data packet further includes information such as a file type, a user identity, a time parameter, and a version identifier.

Figure 1B:
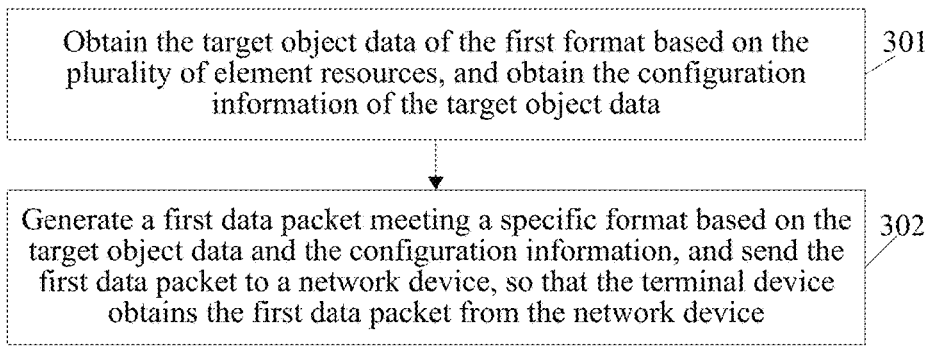
FIG. 1b is a schematic flowchart of an information processing method according to an embodiment of this application.

In some embodiments, when the computing device is a terminal device, some of the plurality of element resources may be generated through manufacturing by a person operating the terminal device, and some of the element resources may be obtained from a device in a platform of the online service. For example, the online service platform may provide a plurality of body element resources, hair element resources, clothes element resources, and the like, for the terminal device to select and download. In some embodiments, the terminal device may obtain various configuration information through a user interface, to generate a data packet, and provides the data packet to the online service platform, and the online service platform provides the data packet to another terminal device. FIG. 1b is a schematic flowchart of an information processing method according to an embodiment of this application. The method may be applied to the terminal device. The terminal device may be specifically a first type of terminal shown in FIG. 2. As shown in FIG. 1b, the method may include the following steps.

Step 301: Obtain the target object data of the first format based on the plurality of element resources, and obtain the configuration information of the target object data, the first format being any file format supporting transmission of specific data.

Step 302: Generate a first data packet meeting a specific format based on the target object data and the configuration information, send the first data packet to a network device, so that the terminal device obtains the first data packet from the network device.

In some other embodiments, when the computing device is a device in an online service platform (online service platform for short below), the terminal device may access the online service platform, select element resources from element resources provided by the online service platform, and/or upload element resources generated through manufacturing by an operator of the terminal device, and call an operation interface provided by the online service platform to generate a target object, and provide the configuration information to the online service platform. The online service platform obtains the element resources selected and/or uploaded by the terminal device and the configuration information, and generates a data packet by using the element resources and the configuration information, and provides the data packet to another terminal device.

In each embodiment, a plurality of preset standard element resources may be obtained, the standard element resources meeting the first format; updating configuration is performed on at least some of the plurality of standard element resources, to obtain a plurality of element resources meeting a requirement; and the target object data of the first format is obtained based on the plurality of element resources. For example, a plurality of standard element resources may be preset in the online service platform, and the standard element resources may be used as element resources in an initial state. Based on the standard element resources, a developer may perform updating configuration to modify the standard element resources, for example, modify attribute information such as the color and type of the hair element resources, the clothes element resources, and the accessory element resources, or modify attribute information of whole element resources after a combination of body, hair, clothes, and accessories.

According to each embodiment, the data packet is developed and manufactured by a professional three-dimensional model manufacturer and provided to a terminal device of a user, and the user does not need to master a development principle of the three-dimensional model, so that the development threshold and development costs of the application program using a three-dimensional model are greatly reduced.

To reduce a development threshold of the application program using a three-dimensional model for rendering the three-dimensional model, in each embodiment, a rendering logic may be encapsulated in the data packet. The rendering logic may be configured to: in response to a call instruction for the data packet, obtain a rendering parameter from the call instruction, render an image layer including the target object, and set an attribute value of the target object in the image layer to a value in the rendering parameter.

To further reduce a development threshold of the application program using a three-dimensional model for operating the three-dimensional model, in each embodiment, an interaction logic may be encapsulated in the data packet. The interaction logic may be configured to: in response to an operation event for the target object rendered in the image layer, obtain an operation parameter from the operation event, and execute an operation corresponding to the operation parameter on the target object rendered in the image layer.

In each embodiment, the data packet may be encapsulated into a form of a software development kit (SDK). Data packets of different SDK versions may be generated for different platforms (for example, a Windows platform and an IOS platform). The data packet provides external call interfaces, so that an external program can call, through the external call interfaces, processing operations encapsulated in the data packet, for example, a rendering function provided by the rendering logic and a 3D model operating function provided by the interaction logic. In this way, after the data packet is provided to the developer of the application program, the developer may add, to the application program, instruction data for calling the data packet, and provides the data packet and the application program to the terminal device. When the terminal device runs the application program, the application program may call the data packet according to a running logic thereof.

For example, attribute values of the target object in the image layer may include the size of the target size, the location and the orientation of the target object in the image layer, and the like. When the application program calls the rendering logic in the data packet, needed information such as the size value, location coordinate values, and orientation of the target object is transmitted to the rendering logic through a call instruction. The rendering logic obtains the rendering parameters from the call instruction, sets corresponding attribute values of the target model, and renders the set target model in the image layer displayed on the screen of the terminal device.

For another example, the user or the application program of the terminal device may operate the target model displayed in the terminal device. For example, when detecting a screen touch operation of the user, the operating system of the terminal device may use a parameter of the screen touch operation as an operation parameter and transmit the operation parameter to the interaction logic in the data packet through an operation instruction; or, when detecting that a preset trigger condition is met, the application program generates an operation parameter corresponding to the trigger condition, and transmits the operation parameter to the interaction logic in the data packet through the operation instruction. The operation parameter may include but is not limited to: the location of the screen touch operation, the action type of the screen touch operation, the size value of the target model, the moving direction and moving distance of the target model, the rotation direction and rotation angle of the target model, an operated element and operation type in the target model, and the like. The interaction logic obtains the operation parameters from the operation instruction, and executes an operation corresponding to the operation parameter on the target model displayed in the terminal device, for example, modifies the size of the target model, makes the target model move or rotate, or modifies an attribute value of an element of the target model.

Each embodiment further provides an information processing apparatus. The apparatus may include an obtaining circuitry and an encapsulation circuitry.

The obtaining circuitry is configured to: obtain target object data of a first format, and obtain configuration information of the target object data, the target object being a three-dimensional model, the target object data including data of a plurality of element resources, and the first format being a file format supporting transmission of three-dimensional model data.

The encapsulation circuitry generates a data packet of a second format based on the target object data and the configuration information, and provides the data packet to a terminal device.

In each embodiment, the encapsulation circuitry may further encapsulate the rendering logic and/or interaction logic in the data packet.

Figure 1C:
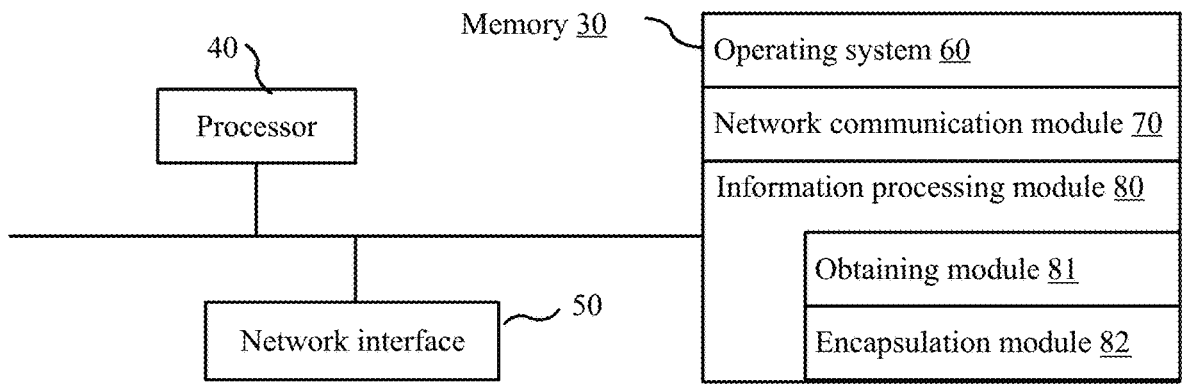
FIG. 1c is a schematic diagram of an information processing apparatus according to an embodiment of this application.

FIG. 1c is a schematic diagram of an information processing apparatus according to an embodiment of this application. As shown in FIG. 1c, the apparatus may include a processor 40, a memory 30, and a network interface 50.

The network interface 50 may enable, by using a communication protocol, the apparatus to communicate with another device in a network.

The processor 40 may be one or more processors disposed in one or more computing devices. The processor 40 may execute a computer readable instruction in the memory 30, to complete an operation corresponding to the instruction.

The memory 30 may be one or more memories disposed in one or more computing devices. The memory 30 may include an operating system 60, a network communication logic 70, and an information processing logic 80.

The information processing logic 80 may include a rendering logic 81 and/or an interaction logic 82.

Figure 2:
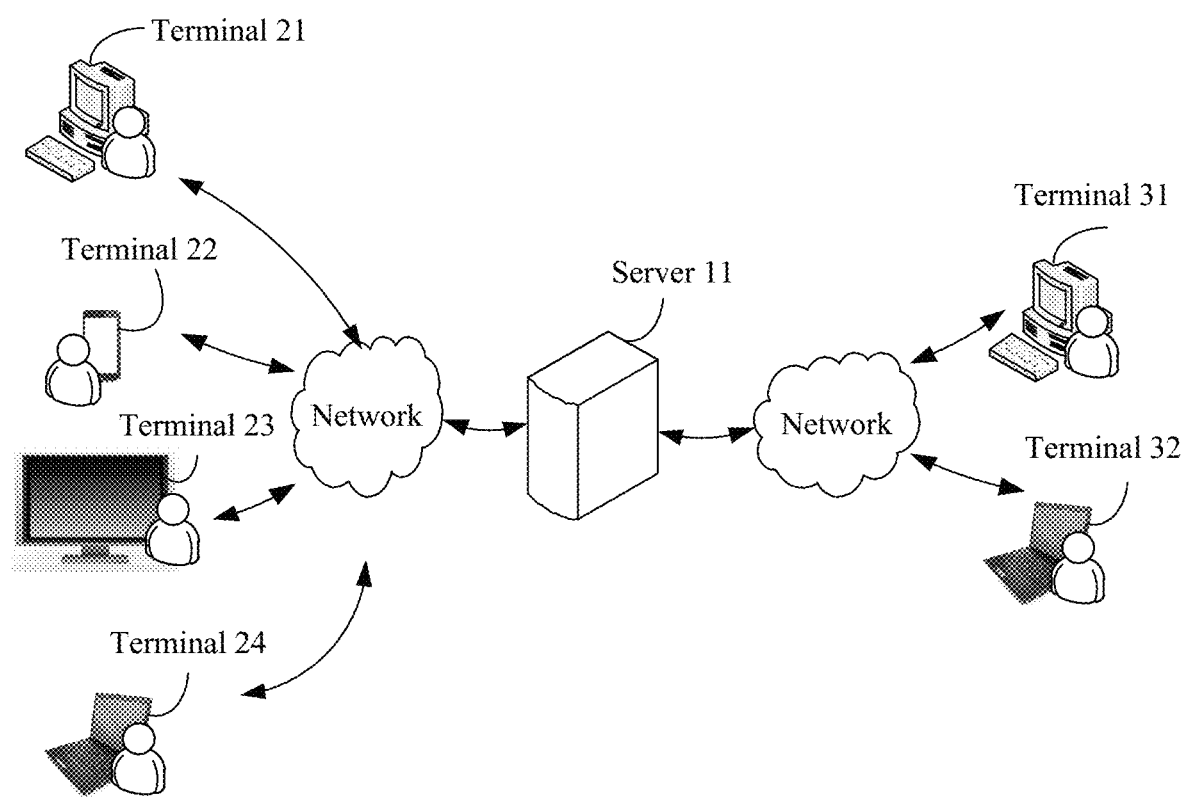
FIG. 2 is a schematic diagram of an application architecture of an information processing method according to an embodiment of this application.

FIG. 2 is a schematic diagram of an application architecture of an information processing method according to an embodiment of this application. As shown in FIG. 2, the application architecture includes a server 11, terminals 21 to 24, and terminals 31 and 32. The terminals 21 to 24 may perform information interaction with the server 11 in a manner of a wired network or a wireless network. Correspondingly, the terminals 31 and 32 may also perform information interaction with the server 11 in a manner of a wired network or a wireless network. The terminals 31 and 32 may be referred to as a first type of terminal, or may be referred to as a model generation end, and the terminals 21 to 24 may be referred to as a second type of terminal, or may be referred to as a model use end.

On the model generation end, a model developer may manufacture a model object through the terminal device shown by the terminals 31 and 32, to generate a data packet including a model object and fused with a specific application program, and send the data packet to the server 11. As a data open platform, the server 11 may provide data including a model object to the user. The user may obtain, through the terminals 21 to 24 as the model use end from the server 11, a data packet that includes a model object and that meets a requirement thereof. When the specific application program is run in the terminal that obtains the data packet, the data packet is also run. When the first image layer corresponding to display content of the specific application program is rendered, the second image layer including the model object is rendered, and the second image layer covers the first image layer in an embedding manner, so that when the image data is output, the model object has a specific display effect on the display content of the specific application program, and when the model object is a 3D model object, there is a display effect of a three-dimensional object. In addition, the data packet is fused with the specific application program, namely, when the specific application program starts to run, the data packet is also run.

The terminal device (including terminals 21 to 24 and terminals 31 and 32) may be implemented through terminal devices of types such as a mobile phone, a tablet computer, a personal computer (PC), and an all-in-one machine. The terminals 31 and 32 have digital file input capabilities, namely, have three-dimensional model data manufacturing and inputting operations.

The server 11 may be used as a server to which the data open platform belongs. The data open platform may be specifically output through a specific webpage or a specific application and is browsed by a terminal user. In an implementation, the data open platform may be presented in a form of an "electronic market" (the "electronic market" is, for example, an APP STORE application in the IOS operating system, or an application downloading platform such as an Android market in the Android operating system). For example, a data packet (the data packet may include a plurality of types, and data of a corresponding target object may be preconfigured in each type of data packet, and the first data packet may be one of the plurality of types of data packets) may be presented in an application downloading platform in a form of "commodity". A user may search for a required data packet in the application downloading platform and performs downloading to obtain the data packet. When needed, if the data packet does not support free downloading, the user further needs to pay some fees to download and obtain the corresponding data packet.

Figure 3A:
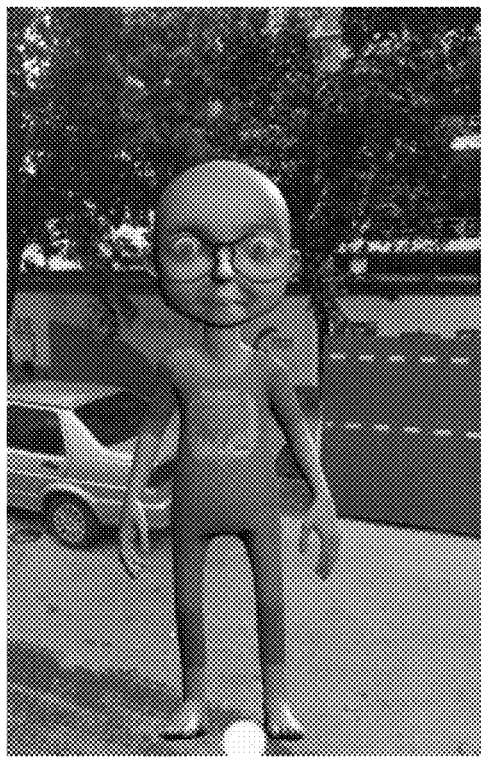
FIG. 3a to FIG. 3d are respectively schematic diagrams of an application scenario of an information processing method according to an embodiment of this application.
Figure 3B:
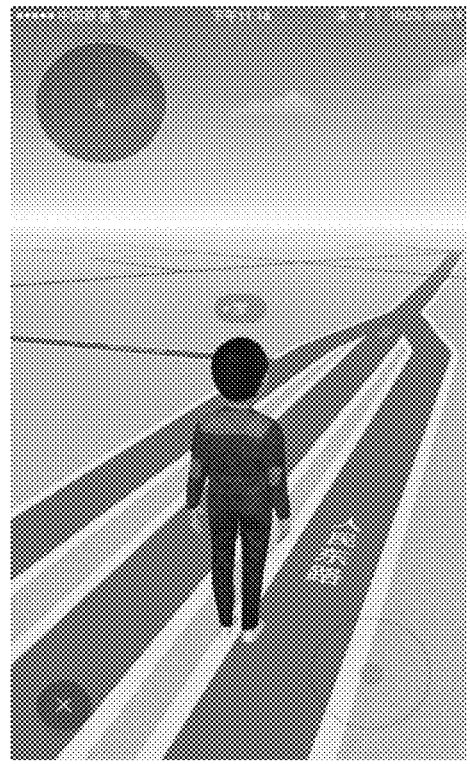
Figure 3C:
Figure 3D:

The type of the specific application program may include: any application program having a three-dimensional model data requirement such as a map type application or a game type application. FIG. 3a to FIG. 3d are respectively schematic diagrams of an application scenario of an information processing method according to an embodiment of this application. In an example, for example, the specific application program is a map type application. Referring to FIG. 3a and FIG. 3b, for example, in FIG. 3a, an application scenario in which the map type application outputs and displays a live view of the location is run, and for another example, an application scenario in which the map type application performs navigation is run. In another example, for example, the specific application program is a map type application. Referring to FIG. 3c and FIG. 3d, an application scenario in which a game type application performs virtual game and virtual socialization is run. In the application scenario shown in FIG. 3a to FIG. 3d, a second image layer including a three-dimensional object may be rendered through the information processing method of this embodiment of this application, and the second image layer is covered on a first image layer corresponding to display content of the application program.

The example shown in FIG. 2 is merely a system architecture example that implements this embodiment of this application. This embodiment of this application is not limited to the system structure of FIG. 2. Based on the system architecture, various embodiments of this application are provided. Correspondingly, examples shown in FIG. 3a to FIG. 3d are merely several application examples of this embodiment of this application. The information processing scheme of this embodiment of this application is not limited to application to the several application examples.

Figure 4:
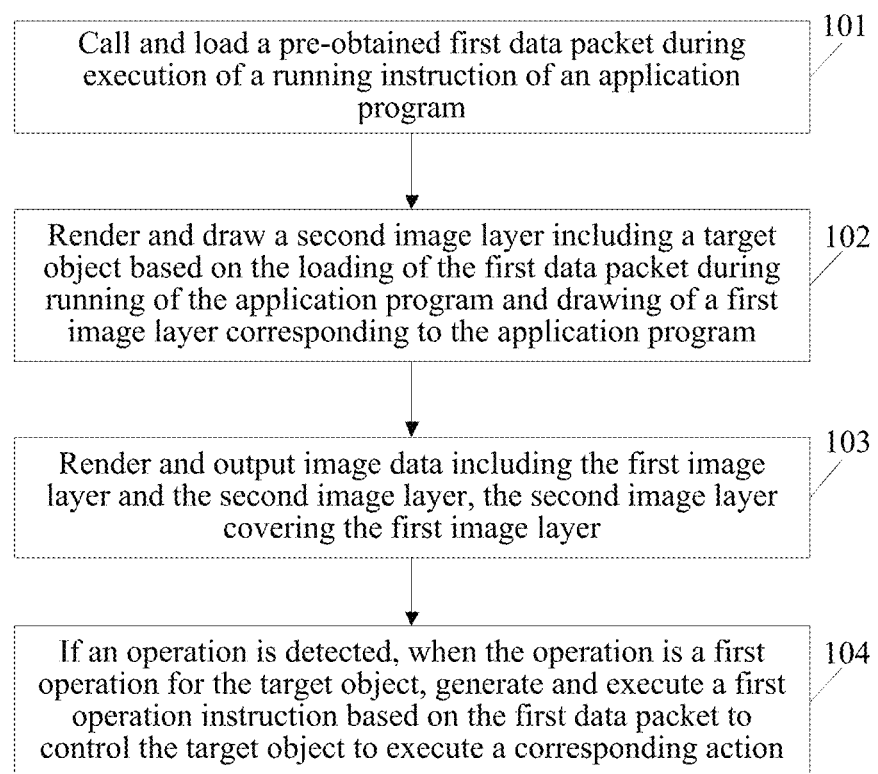
FIG. 4 is a first schematic flowchart of an information processing method according to an embodiment of this application.

An embodiment of this application provides an information processing method, applied to a terminal device. The terminal device may be a second type of terminal shown in FIG. 2. FIG. 4 is a first schematic flowchart of an information processing method according to an embodiment of this application. As shown in FIG. 4, the method includes:

Step 101: Call and load a pre-obtained first data packet during execution of a running instruction of an application program.

Step 102: Draw a second image layer including a target object based on the loading of the first data packet during running of the application program and drawing of a first image layer corresponding to the application program, a specific display attribute being configured in areas other than the target object in the second image layer.

Step 103: Render and output image data including the first image layer and the second image layer, the second image layer covering the first image layer.

Step 104: If an operation is detected, when the operation is a first operation for the target object, generate and execute a first operation instruction based on the first data packet to control the target object to execute a corresponding action.

In this embodiment, the calling and loading a pre-obtained first data packet during execution of a running instruction of an application program includes: when an operation of an icon corresponding to the application program is detected, generating and executing the running instruction of the application program, to run the application program; or, when it is detected that the application program switches from a background running status to a front end running status, generating and executing the running instruction of the application program, to run the application program on the front end, the background running status indicating a status in running but not displaying running, and the front end running status indicating a status in running and displaying running. Namely, in this embodiment, when the application program is activated to run, or switches from background running to front end running, a pre-obtained first data packet is called and loaded.

The first data packet may be pre-obtained by the terminal device in a manner of a wired data connection or wireless communication. In an example, the terminal device may obtain, in a manner of a wired data connection, the first data packet sent by the computer device (such as another terminal device). In another example, the terminal device may download the first data packet from the server 11 shown in FIG.

2 in a wireless communication manner. The first data packet may be encapsulated in a form of an SDK.

In this embodiment, when the application program is run and the first image layer corresponding to display content of the application program is drawn, a second image layer including a target object is drawn based on the run first data packet, target object data being preconfigured in the first data packet. The first data packet may include at least one piece of target object data. Namely, when the second image layer including the target object is drawn, the number of target objects in the second image layer may be at least one. During actual application, the second image layer may be rendered in a manner of an open graphics library (OpenGL), so that the second image layer has a specific display attribute. The specific display attribute is, for example, a transparent background and foreground customizable content, namely, a foreground customization target object. Areas other than the target object are set to a transparent display attribute, so that when the second image layer covers the first image layer, the target object is presented and fused in display content of the application program, and areas other than the area covered by the target object in the display content of the application program can be browsed by a user through the first image layer in the transparent display attribute.

The first data packet includes target object data. The target object data is used to draw a corresponding target object during running of the first data packet. The target object may be specifically a three-dimensional object. Namely, after the second image layer is rendered, a user may see a target object having a three-dimensional effect.

In this embodiment, when image data is rendered and output, the second image layer is covered on the first image layer, and a combined image layer is rendered as image data and is output. During actual application, a to-be-output image may include a plurality of layers during image drawing. Each layer may include different elements in the image. For example, an image layer including background image data may be disposed on a bottom image layer, and other elements other than the background image data in the image data may be disposed on other image layers other than a top image layer and the bottom image layer according to an actual requirement. The second image layer in this embodiment may be disposed on a top layer. The first image layer in this embodiment may include other image layers other than the top image layer. A configuration parameter of each image layer may be configured. A location of each image layer in all image layers may be determined based on the configuration parameter. In an actual drawing process, relative layer locations of the image layers may be formatted based on configuration parameters carried in the image layers, and then image data in the image layer is drawn.

In this embodiment, the detecting an operation includes: detecting a screen operation based on a touch sensing assembly, or detecting an input operation based on an input assembly. The input assembly includes at least one of the following: a physical key, a built-in keyboard, an external keyboard, a mouse, and other data input devices. In an implementation, when the terminal device is a terminal device of a type such as a mobile phone or a tablet computer having a touch sensing screen, a screen operation may be detected through the touch sensing screen. In another implementation, when the terminal device is a terminal device of a type such as a mobile phone having a physical key or a computer having a keyboard and/or a mouse, an input operation may be detected through a data input device such as a physical key, a keyboard, or a mouse. Further, determining whether the operation is the first operation for the target object includes: obtaining location information of the operation, and obtaining relative location information of the target object; and calculating an offset distance between the location information and the relative location information, and determining that the operation is the first operation for the target object when the offset distance does not reach a preset threshold.

In an implementation, when a screen operation is detected, it is detected whether the screen operation is a first operation for the target object. Target object data corresponding to the target object includes relative location information. The relative location information may represent a location of the current target object in a display screen. During actual application, the relative location information may be indicated through coordinate information in which the display screen is a coordinate plane. An operation location of the screen operation is detected through a touch sensing assembly, and is compared with the relative location information of the target object for calculation, to obtain an offset distance between the operation location and the relative location information. When the offset distance does not reach a preset threshold, it may be determined that the operation location matches the relative location information, namely, it is determined that the screen operation is for the target object, and it is detected that the screen operation is the first operation for the target object. During actual application, based on the second image layer located on the top layer, the screen operation may be detected by the first data packet, and it is determined whether the screen operation is the first operation for the target object. In other implementations, the screen operation may also be detected by an operating system, and the operating system determines whether the screen operation is the first operation for the target object.

In another implementation, when an input operation is detected, it is detected whether the input operation is a first operation for the target object. After the first data packet is loaded, an input interface that can receive a view layer is provided. An input operation of a data input device may be first detected by the view layer, and location information of the input operation in the view layer is obtained. Location information of the input operation in the view layer is obtained through the input interface provided after the first data packet is loaded. Target object data corresponding to the target object includes relative location information. The relative location information may represent a location of the current target object in a display screen. During actual application, the relative location information may be indicated through coordinate information in which a display screen is a coordinate plane. The location information of the input operation in the view layer is compared with the relative location information of the target object for calculation, to obtain an offset distance between the location information of the input operation in the view layer and the relative location information. When the offset distance does not reach a preset threshold, it may be determined that the location information of the input operation in the view layer matches the relative location information, namely, it is determined that the input operation is for the target object, and it is detected that the input operation is the first operation for the target object.

In this embodiment, when it is determined that the operation is the first operation for the target object, a first operation instruction is generated and executed based on the first data packet. In an implementation, when the operating system detects the first operation, a target object event corresponding to the first operation is generated and the first data packet is notified. In another implementation, based on the second image layer located on the top layer, the first data packet may directly detect the first operation. At least one group of operations and corresponding operation instructions are preconfigured in the first data packet. When the first operation is detected, namely, when a target object event corresponding to the first operation is received, the first operation instruction corresponding to the first operation is obtained and executed. The first operation instruction is used to control the target object to execute a corresponding action. The action is, for example, an action such as movement or jumping. When the target object is presented as a three-dimensional avatar object, the action may also be an action that controls four limbs of the three-dimensional avatar object, and/or, that controls facial expression changes of the three-dimensional avatar object. When the operating system generates a target object event corresponding to the first operation and notifies the first data packet, a processing status notification is sent to the application program, and the processing status notification is used to notify the application program of the current processing process.

In this embodiment, when the run application program is a map type application program, reference may be made to FIG. 3a and FIG. 3b for a specific application scenario. FIG. 3a shows a scenario in which a three-dimensional map display function in the map type application program is activated. In this scenario, the pre-obtained first data packet is called and loaded, to implement display of the virtual three-dimensional avatar object shown in FIG. 3a included in the first data packet in the three-dimensional map. When an operation is performed for the virtual three-dimensional avatar object, the virtual three-dimensional avatar object may execute a corresponding action such as advancing, retreating, or jumping based on the operation. When an operation is formed for a background (the virtual three-dimensional avatar may be used as a foreground, and the displayed three-dimensional map may be used as a background) other than the virtual three-dimensional avatar object, the map type application executes a corresponding instruction for the operation. The instruction is, for example, viewing detailed information of a location in a three-dimensional map, location searching, or route searching. FIG. 3b may show a scenario in which a navigation function in the map type application program (in an example, the navigation function may be specifically a walking navigation function) is activated. In this scenario, the pre-obtained first data packet is called and loaded, to implement display of the virtual three-dimensional avatar object shown in FIG. 3b included in the first data packet at a start location of a navigation interface. When a navigation operation is executed, the virtual three-dimensional avatar object may move based on a navigation route.

In another scenario example, FIG. 3c shows a scenario in which the run application program is a game type application program. FIG. 3c may show a game type application including a virtual three-dimensional avatar object. The pre-obtained first data packet is called and loaded, to implement display of the virtual three-dimensional avatar object shown in FIG. 3c included in the first data packet in a game interface as a background. In an example, the virtual three-dimensional avatar object may execute an action such as advancing, retreating, or jumping based on the operation for the virtual three-dimensional avatar object. In another example, the virtual three-dimensional avatar object may also change the appearance (for example, change clothes, hairstyle, accessories, or makeup) of the virtual three-dimensional avatar object in combination with an operation detected by the game application.

By using the technical solution of this embodiment of this application, the obtained first data packet is loaded during running of the application program, and the second image layer that includes the target object and that is drawn based on the loading of the first data packet is covered on the first image layer drawn based on the running of the application program, so that a display effect that the target object is fused with the display content of the application program is implemented. In addition, the fused display content supports user operations, thereby implementing smooth communication between the target object and the display content of the application program. On the other hand, the first data packet is independent of the application program, so that the first data packet can be developed by a dedicated development group, and a user does not need to learn a development principle of the target object, and the target object fused with the display content of the application program can be obtained by obtaining the first data packet from the network device. The first data packet is developed by a professional developer of the target object, so that the development threshold and development costs are greatly reduced, and development time is reduced.

Figure 5:
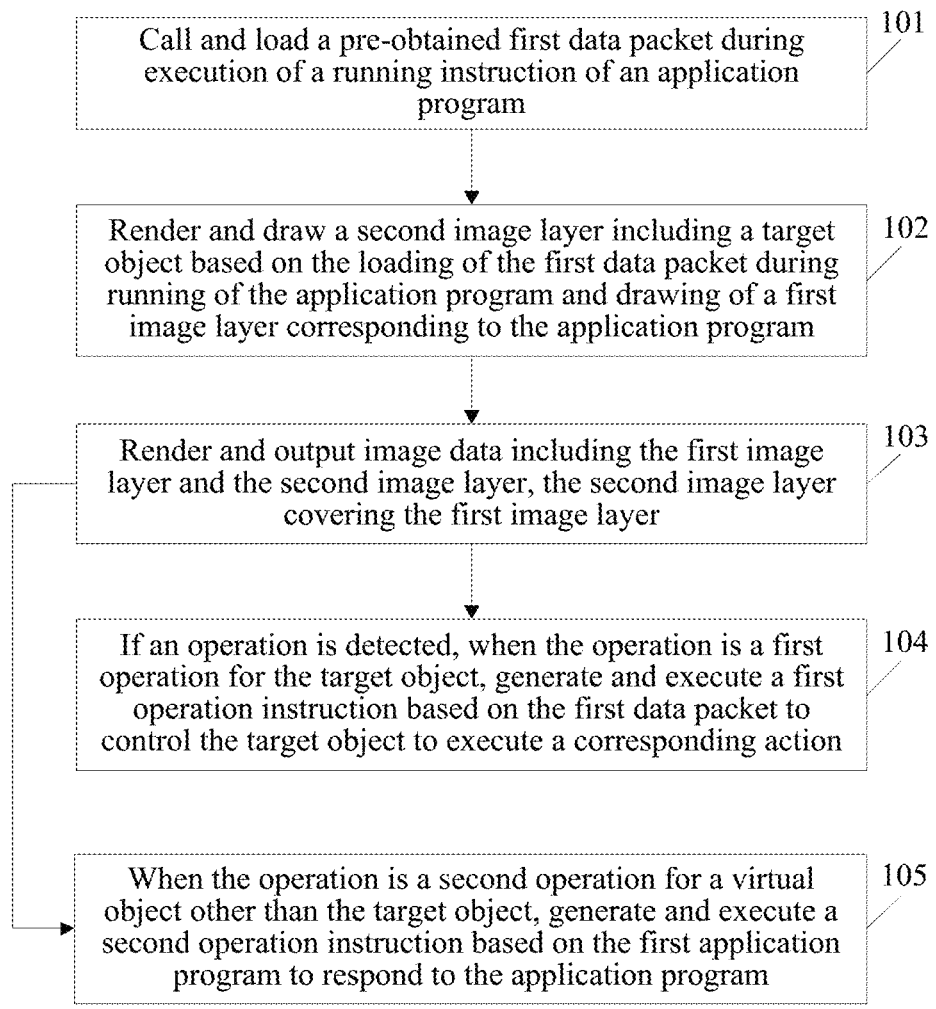
FIG. 5 is a second schematic flowchart of an information processing method according to an embodiment of this application.

Based on the foregoing embodiment, FIG. 5 is a second schematic flowchart of an information processing method according to an embodiment of this application. As shown in FIG. 5, based on the foregoing embodiment, the information processing method of this embodiment of this application further includes:

Step 105: When the operation is a second operation for a virtual object other than the target object, generate and execute a second operation instruction based on the application program to respond to the application program.

In this implementation, when it is determined that the operation is a second operation for other virtual objects other than the target object, namely, the operation is not for the target object, namely, areas other than the target object in the first image layer have a transparent display attribute, so that the operation is for the virtual object included in the application program rendered in the first image layer, in an implementation, the operating system detects the second operation, and an application program event corresponding to the second operation is generated based on an identification result that the second operation is not for the target object, and the application program event is notified to the application program. In another implementation, the first data packet detects a second operation, and an application program event corresponding to the second operation is generated based on an identification result that the second operation is not for the target object, and the application program event is notified to the application program, so that the application program generates and executes a second operation instruction according to the application program event of the second operation, and the second operation instruction is used to respond to the application program. In this way, smooth communication between the target object and the display content of the application program is implemented, and seamless fusion between the first data packet and the application program is also implemented.

Figure 6:
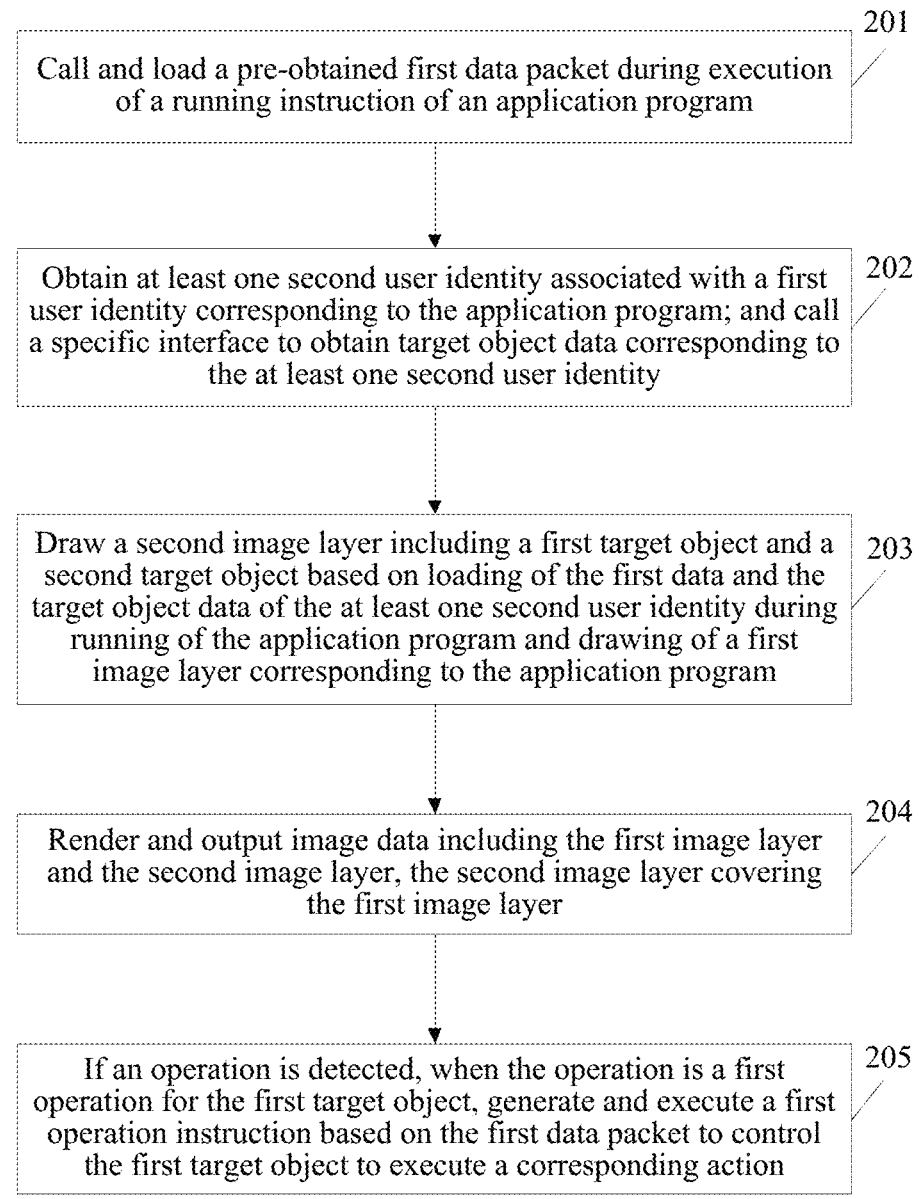
FIG. 6 is a fourth schematic flowchart of an information processing method according to an embodiment of this application.

An embodiment of this application further provides an information processing method. FIG. 6 is a third schematic flowchart of an information processing method according to an embodiment of this application. As shown in FIG. 6, the method includes:

Step 201: Call and load a pre-obtained first data packet during execution of a running instruction of an application program.

Step 202: Obtain at least one second user identity associated with a first user identity corresponding to the application program; and call a specific interface to obtain target object data corresponding to the at least one second user identity.

Step 203: Draw a second image layer including a first target object and a second target object based on loading of the first data and the target object data of the at least one second user identity during running of the application program and drawing of a first image layer corresponding to the application program, the first target object corresponding to the first user identity, and the second target object corresponding to the second user identity, and a specific display attribute being configured in areas other than the first target object and the second target object in the second image layer.

Step 204: Render and output image data including the first image layer and the second image layer, the second image layer covering the first image layer.

Step 205: If an operation is detected, when the operation is a first operation for the first target object, generate and execute a first operation instruction based on the first data packet to control the first target object to execute a corresponding action.

In this embodiment, the calling and loading a pre-obtained first data packet during execution of a running instruction of an application program includes: when an operation of an icon corresponding to the application program is detected, generating and executing the running instruction of the application program, to run the application program; or, when it is detected that the application program switches from a background running status to a front end running status, generating and executing the running instruction of the application program, to run the application program on the front end, the background running status indicating a status in running but not displaying running, and the front end running status indicating a status in running and displaying running. Namely, in this embodiment, when the application program is activated to run, or switches from background running to front end running, a pre-obtained first data packet is called and loaded.

The first data packet may be pre-obtained by the terminal device in a manner of a wired data connection or wireless communication. In an example, the terminal device may obtain, in a manner of a wired data connection, the first data packet sent by the computer device (such as another terminal device). In another example, the terminal device may download the first data packet from the server 11 shown in FIG. 2 in a wireless communication manner. The first data packet may be encapsulated in a form of an SDK.

In this embodiment, after the pre-obtained first data packet is called and loaded, at least one second user identity associated with the first user identity corresponding to the application program is obtained. The first user identity may be specifically indicated by a user account of the application program. When the application program needs to be registered and logged, the first user identity may be a user account after the user performs registration based on the application program. The first user identity may also be specifically a terminal identifier of the terminal to which the application program belongs. When the application program can be used without registration, the first user identity can be indicated by the terminal identifier of the terminal to which the application program belongs, and there may be a one-to-one correspondence between the terminal identifier and the terminal.

The at least one second user identity has a specific association with the first user identity. The specific association may be specifically a direct association or an indirect association. The direct association is specifically that user associated data corresponding to the first user identity includes at least one second user identity, for example, friend data corresponding to the first user identity includes at least one second user identity, or "subscribed" data or "focused" data corresponding to the first user identity includes at least one second user identity. The indirect association is specifically that user associated data corresponding to the first user identity does not include at least one second user identity; there may be at least one type of same attribute information between the first user identity and the at least one second user identity; the attribute information includes but is not limited to at least one of the following information: geographical information, user label information (hobby attribute information, personality attribute information, and the like), and the like. The attribute information may also be specifically an associated user identity. Namely, friend data corresponding to the first user identity and friend data corresponding to at least one second user identity include at least one same user identity, namely, there is at least one same friend between the first user and the at least one second user.

In this embodiment, the first data packet provides a specific interface. The specific interface supports being called by the outside. For example, when two terminals both load and run the first data packet, after loaded and run, the first data packet of the first terminal may call a specific interface of the first data packet of the second terminal, to obtain target object data corresponding to the second user identity in the second data packet. Namely, the first data packet has a calling capability open to the outside.

In this embodiment, during running of the application program and drawing of the first image layer corresponding to the display content of the application program, the second image layer including the first target object corresponding to the first user identity and the second target object corresponding to the second user identity is drawn based on the run first data packet, and the target object data that is obtained based on the specific interface, data of the first target object corresponding to the first user identity being preconfigured in the first data packet; the first data packet may include data of at least one first target object; the target object data obtained based on the specific interface may include data of at least one second target object separately corresponding to any second user identity; namely, during drawing of the second image layer including the first target object and the second target object, the second image layer may include at least one first target object and at least one second target object. During actual application, the second image layer may be rendered in a manner of an OpenGL, so that the second image layer has a specific display attribute. The specific display attribute is, for example, a transparent background and foreground customizable content, namely, a foreground customization target object. Areas other than the target object (including the first target object and the second target object) are set to a transparent display attribute, so that when the second image layer covers the first image layer, the first target object and the second target object are presented and fused in display content of the application program, and areas other than the areas covered by the first target object and the second target object in the display content of the application program can be browsed by a user through the first image layer in the transparent display attribute. The first target object and the second target object may be both three-dimensional objects. Namely, after the second image layer is rendered, a user may see a target object having a three-dimensional effect.

During actual application, a to-be-output image may include a plurality of layers during image drawing. Each layer may include different elements in the image. For example, an image layer including background image data may be disposed on a bottom image layer, and other elements other than the background image data in the image data may be disposed on other image layers other than a top image layer and the bottom image layer according to an actual requirement. The second image layer in this embodiment may be disposed on a top layer. The first image layer in this embodiment may include other image layers other than the top image layer. A configuration parameter of each image layer may be configured. A location of each image layer in all image layers may be determined based on the configuration parameter. In an actual drawing process, relative layer locations of the image layers may be formatted based on configuration parameters carried in the image layers, and then image data in the image layer is drawn.

In this embodiment, the detecting an operation includes: detecting a screen operation based on a touch sensing assembly, or detecting an input operation based on an input assembly. The input assembly includes at least one of the following: a physical key, a built-in keyboard, an external keyboard, a mouse, and other data input devices. In an implementation, when the terminal device is a terminal device of a type such as a mobile phone or a tablet computer having a touch sensing screen, a screen operation may be detected through the touch sensing screen. In another implementation, when the terminal device is a terminal device of a type such as a mobile phone having a physical key or a computer having a keyboard and/or a mouse, an input operation may be detected through a data input device such as a physical key, a keyboard, or a mouse. Further, determining whether the operation is the first operation for the target object includes: obtaining location information of the operation, and obtaining relative location information of the target object; and calculating an offset distance between the location information and the relative location information, and determining that the operation is the first operation for the target object when the offset distance does not reach a preset threshold.

In an implementation, when a screen operation is detected, it is detected whether the screen operation is a first operation for the first target object. Target object data corresponding to the first target object includes relative location information. The relative location information may represent a location of the current first target object in a display screen. During actual application, the relative location information may be indicated through coordinate information in which the display screen is a coordinate plane. An operation location of the screen operation is detected through a touch sensing assembly, and is compared with the relative location information of the first target object for calculation, to obtain an offset distance between the operation location and the relative location information. When the offset distance does not reach a preset threshold, it may be determined that the operation location matches the relative location information, namely, it is determined that the screen operation is for the first target object, and it is detected that the screen operation is the first operation for the first target object. During actual application, based on the second image layer located on the top layer, the screen operation may be detected by the first data packet, and it is determined whether the screen operation is the first operation for the first target object. In other implementations, the screen operation may also be detected by an operating system, and the operating system determines whether the screen operation is the first operation for the target object.

In another implementation, when an input operation is detected, it is detected whether the input operation is a first operation for the first target object. After the first data packet is loaded, an input interface that can receive a view layer is provided. An input operation of a data input device may be first detected by the view layer, and location information of the input operation in the view layer is obtained. Location information of the input operation in the view layer is obtained through the input interface provided after the first data packet is loaded. Target object data corresponding to the first target object includes relative location information. The relative location information may represent a location of the current first target object in a display screen. During actual application, the relative location information may be indicated through coordinate information in which a display screen is a coordinate plane. The location information of the input operation in the view layer is compared with the relative location information of the first target object for calculation, to obtain an offset distance between the location information of the input operation in the view layer and the relative location information. When the offset distance does not reach a preset threshold, it may be determined that the location information of the input operation in the view layer matches the relative location information, namely, it is determined that the input operation is for the first target object, and it is detected that the input operation is the first operation for the first target object.

In this embodiment, when it is determined that the operation is the first operation for the first target object, a first operation instruction is generated and executed based on the first data packet. In an implementation, when the operating system detects the first operation, a target object event corresponding to the first operation is generated and the first data packet is notified. In another implementation, based on the second image layer located on the top layer, the first data packet may directly detect the first operation. At least one group of operations and corresponding operation instructions are preconfigured in the first data packet. When the first operation is detected, namely, when a target object event corresponding to the first operation is received, the first operation instruction corresponding to the first operation is obtained and executed. The first operation instruction is used to control the first target object to execute a corresponding action. The action is, for example, an action such as movement or jumping. When the first target object is presented as a three-dimensional avatar object, the action may also be an action that controls four limbs of the three-dimensional avatar object, and/or, that controls facial expression changes of the three-dimensional avatar object.

In an implementation, the method may further include: when the operation is a second operation for a virtual object other than the first target object and the second target object, generating and executing a second operation instruction based on the application program to respond to the application program.

In this implementation, when it is determined that the operation is a second operation for other virtual objects other than the target object (including the first target object and the second target object), namely, the operation is not for the first target object or the second target object, namely, areas other than the target object (including the first target object and the second target object) in the first image layer have a transparent display attribute, so that the operation is for the virtual object included in the application program rendered in the first image layer, in an implementation, the operating system detects the second operation, and an application program event corresponding to the second operation is generated based on an identification result that the second operation is not for the target object, and the application program event is notified to the application program. In another implementation, the first data packet detects a second operation, and an application program event corresponding to the second operation is generated based on an identification result that the second operation is not for the target object, and the application program event is notified to the application program, so that the application program generates and executes a second operation instruction according to the application program event of the second operation, and the second operation instruction is used to respond to the application program.

An example in this embodiment may be shown in FIG. 3d. FIG. 3d shows a scenario of a game type application program. FIG. 3d shows a scenario of a game type application that may include at least two virtual three-dimensional avatar objects. One of the at least two virtual three-dimensional avatar objects is a first virtual three-dimensional avatar object corresponding to a terminal user (FIG. 3d shows a female virtual three-dimensional avatar object). The first virtual three-dimensional avatar object supports receiving an input operation of the terminal and executing a corresponding action. The virtual three-dimensional avatar object other than the first virtual three-dimensional avatar object in the at least two virtual three-dimensional avatar objects (for example, FIG. 3d shows a male virtual three-dimensional avatar object) is a virtual three-dimensional avatar object corresponding to another terminal user having an association (the association, for example, may be a friendship, "subscribed' relationship, or "focused" relationship) with the terminal user. The terminal user may interact with the another terminal corresponding to the another terminal user through the first virtual three-dimensional avatar object. The interaction may be an action interaction between virtual three-dimensional avatar objects. The action interaction, for example, is a waving action, a handshake action, a touch action, or the like. The interaction may also be information interaction based on virtual three-dimensional avatar objects. For example, a terminal user inputs a plurality pieces of text and sends the text through one piece of information. In an example, the information may also be output in an image. Specifically, for example, the information is output on a head top of the first virtual three-dimensional avatar object corresponding to the terminal user in a manner of a short-cut menu. In another example, the information may also be converted into voice data for output. The another terminal corresponding to the another virtual three-dimensional avatar object receives the information. In an example, the information may be output and displayed in a display interface of the another terminal. For example, the information is displayed on a head top of the first virtual three-dimensional avatar object in the display interface of the another terminal in a manner of a short-cut menu. In another example, the information may also be converted into voice data for output so that the another user terminal can hear it.

By using the technical solution of this embodiment of this application, the obtained first data packet is loaded during running of the application program, and the second image layer that includes the target object and that is drawn based on the loading of the first data packet is covered on the first image layer drawn based on the running of the application program, so that a display effect that the target object is fused with the display content of the application program is implemented. In addition, the fused display content supports user operations, thereby implementing smooth communication between the target object and the display content of the application program. According to a second aspect, the first data packet provides a specific interface supporting calling, to implement interaction between target objects having an association there between, thereby greatly improving operation experience of users. According to a third aspect, the first data packet is independent of the application program, so that the first data packet can be developed by a dedicated development group, and a user does not need to learn a development principle of the target object, and the target object fused with the display content of the application program can be obtained by obtaining the first data packet from the network device. The first data packet is developed by a professional developer of the target object, so that the development threshold and development costs are greatly reduced, and development time is reduced.

Figure 7:
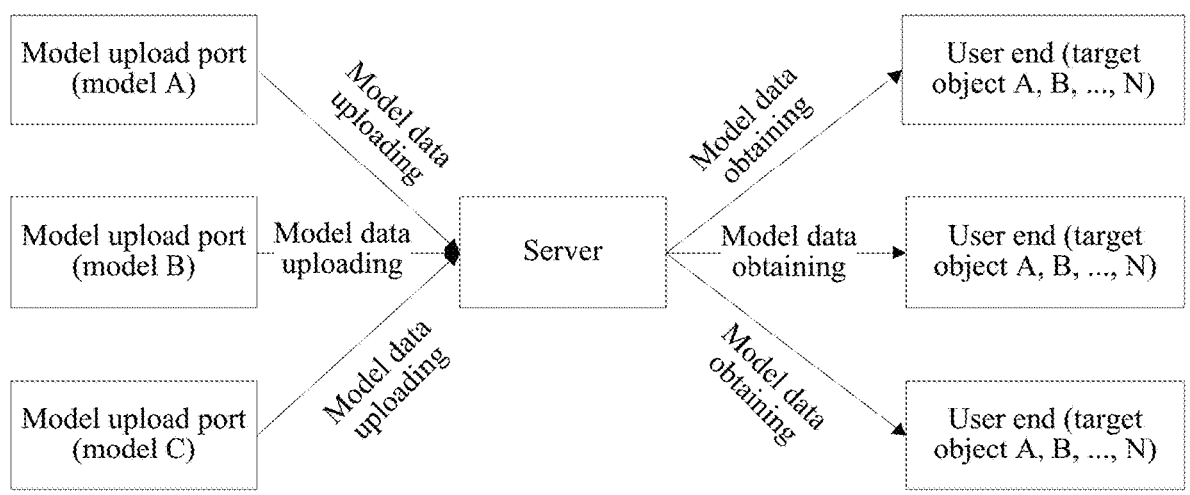
FIG. 7 is a schematic diagram of interaction of an information processing method according to an embodiment of this application.

Based on the descriptions of the foregoing information processing method applied to the first type of terminal and the second type of terminal, FIG. 7 is a schematic diagram of interaction of an information processing method according to an embodiment of this application. As shown in FIG. 7, a model upload port on the left side of a server uploads model data, and the uploaded model is specifically the first data packet in the foregoing embodiment. During actual application, a developer may manufacture and generate model data through a terminal device such as a PC and upload the model data to the server through the model upload port. Different developers may manufacture different models. For example, a developer A may manufacture a model A and upload the model A to the server through the model upload port. A developer B may manufacture a model B and upload the model B to the server through the model upload port, and so on. A user end on the right side of the server may be used as a user or a caller, and may obtain model data from the server side and load the model data during running of a specific application program. The model data may include at least one target object.

Figure 8:
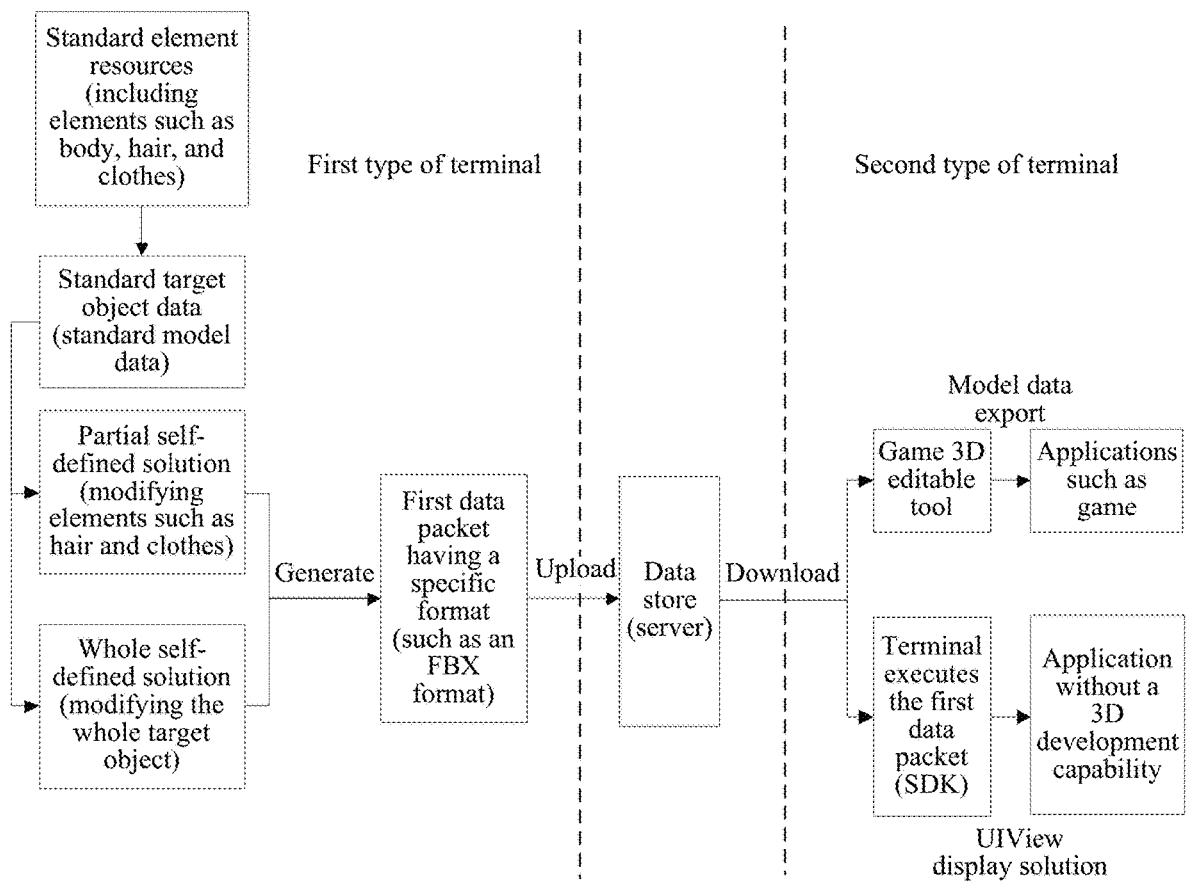
FIG. 8 is another schematic diagram of interaction of an information processing method according to an embodiment of this application.

FIG. 8 is another schematic diagram of interaction of an information processing method according to an embodiment of this application. Based on FIG. 7 in combination with FIG. 8, on the side of the first type of terminal (namely, the terminal used by the developer), standard element resources are developed and manufactured. The standard element resources include a standard body element resource, a standard hair element resource, a standard clothes element resource (the clothes may include tops, pants, configurations, and the like), and the like. Standard target object data (or may referred to as standard model data) is generated based on the standard element resources. During actual application, the target object data manufactured and generated by the developer may use any file format that supports transmission of 3D model data, for example, a DAE format, an FBX format, or an OBJ format.

For different application scenarios, attribute parameters of at least some elements of the required target object need to be modified according to requirements, such as attribute parameters of elements like hair type and/or color, clothes type and/or color, or accessory type and/or color. During actual application, a self-defined solution may be configured for some elements. For example, independent modification configuration is performed on attribute parameters of one or several elements, or a self-defined solution is configured to the whole target object, namely, modification configuration is performed on attribute parameters of the whole target object. Any one of the foregoing self-defined solutions can generate the specific first data packet (namely, model data) in a unified format, and the specific format is, for example, an FBX format. The first data packet is uploaded to a server having a data store function.

A display interface of the data store (equivalent to a server) outputs and displays an identifier corresponding to uploaded content. It may be understood that the data store is equivalent to an open platform of the model data, and a user may search in the data store for required model data. During actual application, to obtain required model data, the user further needs to pay some fees in some cases. Only after the payment is completed, the user can download from the data store (namely, the server) to obtain the corresponding first data packet (namely, the model data).

The second type of terminal (namely, a user or a caller) side obtains the corresponding first data packet through the data store. For an application scenario, namely, when the second type of terminal has a game 3D editable tool such as Unity 3D, during running of the corresponding game application, model data included in the first data packet is exported, and otherwise, an information processing solution of this embodiment of this application may be used, to execute the first data packet, and the target object is fused into display content of an application without a 3D development capability through a 3D rendering layer embedding solution.

Figure 9:
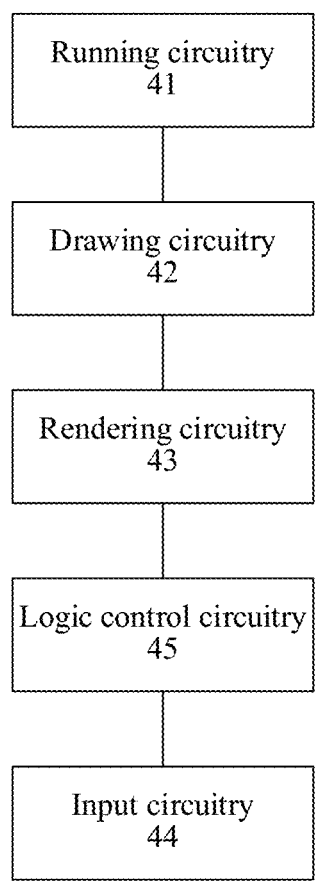
FIG. 9 is a first schematic structural diagram of an information processing apparatus according to an embodiment of this application.

An embodiment of this application further provides an information processing apparatus. FIG. 9 is a first schematic structural diagram of an information processing apparatus according to an embodiment of this application. As shown in FIG. 9, the apparatus includes: a running circuitry 41, a drawing circuitry 42, a rendering circuitry 43, an input circuitry 44, and a logic control circuitry 45.

The running circuitry 41 is configured to: call and load a pre-obtained first data packet during execution of a running instruction of an application program.

The drawing circuitry 42 is configured to: draw a second image layer including a target object based on the loading of the first data packet during running of the application program by the running circuitry 41 and drawing of a first image layer corresponding to the application program, a specific display attribute being configured in areas other than the target object in the second image layer.

The rendering circuitry 43 is configured to: render and output image data comprising the first image layer and the second image layer, the second image layer covering the first image layer.

The input circuitry 44 is configured to detect an operation.

The logic control circuitry 45 is configured to: when the operation detected by the input circuitry 44 is a first operation for the target object, generate and execute a first operation instruction based on the first data packet to control the target object to execute a corresponding action.

In this embodiment, the logic control circuitry 45 is configured to: obtain location information of the operation detected by the input circuitry 44, and obtain relative location information of the target object; and calculate an offset distance between the location information and the relative location information, and determine that the operation is the first operation for the target object when the offset distance does not reach a preset threshold.

In an implementation, the logic control circuitry 45 is further configured to: when the operation detected by the input circuitry 44 is a second operation for a virtual object other than the target object, generate and execute a second operation instruction based on the application program to respond to the application program.

A person skilled in the art should understand that reference may be made to the related descriptions of the foregoing information processing method for operations of the circuitry in the information processing apparatus in this embodiment of this application. The processing circuitry in the information processing apparatus in this embodiment of this application may be implemented through an analog and/or digital circuit implementing the embodiment of this application, or may be implemented through hardware or a combination of hardware and software that executes the logic of this embodiment of this application on an intelligent terminal.

Figure 10:
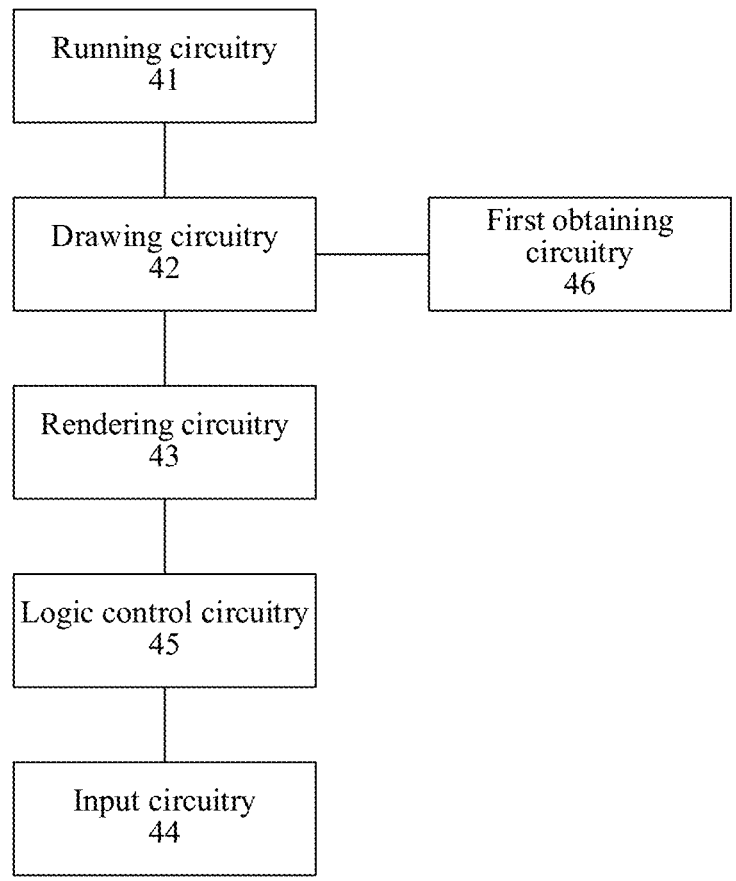
FIG. 10 is a second schematic structural diagram of an information processing apparatus according to an embodiment of this application.

An embodiment of this application further provides an information processing apparatus. FIG. 10 is a second schematic structural diagram of an information processing apparatus according to an embodiment of this application. As shown in FIG. 10, the apparatus includes: a running circuitry 41, a first obtaining circuitry 46, a drawing circuitry 42, a rendering circuitry 43, an input circuitry 44, and a logic control circuitry 45.

The running circuitry 41 is configured to: call and load a pre-obtained first data packet during execution of a running instruction of an application program.

The first obtaining circuitry 46 is configured to: obtain at least one second user identity associated with a first user identity corresponding to the application program; and call a specific interface to obtain target object data corresponding to the at least one second user identity.

The drawing circuitry 42 is configured to draw a second image layer including a first target object and a second target object based on the loading of the first data packet by the running circuitry 41 and the target object data of the at least one second user identity that is obtained by the obtaining circuitry during running of the application program by the running circuitry 41 and drawing of a first image layer corresponding to the application program, the first target object corresponding to the first user identity, and the second target object corresponding to the second user identity, and a specific display attribute being configured in areas other than the target object in the second image layer.

The rendering circuitry 43 is configured to: render and output image data comprising the first image layer and the second image layer, the second image layer covering the first image layer.

The input circuitry 44 is configured to detect an operation.

The logic control circuitry 45 is configured to: when the operation detected by the input circuitry 44 is a first operation for the first target object, generate and execute a first operation instruction based on the first data packet to control the first target object to execute a corresponding action.

In this embodiment, the logic control circuitry 45 is configured to: obtain location information of the operation detected by the input circuitry 44, and obtain relative location information of the first target object; and calculate an offset distance between the location information and the relative location information, and determine that the operation is the first operation for the first target object when the offset distance does not reach a preset threshold.

In an implementation, the logic control circuitry 45 is further configured to: when the operation detected by the input circuitry 44 is a second operation for a virtual object other than the first target object and the second target object, generate and execute a second operation instruction based on the application program to respond to the application program.

A person skilled in the art should understand that reference may be made to the related descriptions of the foregoing information processing method for operations of the circuitry in the information processing apparatus in this embodiment of this application. The circuitry in the information processing apparatus in this embodiment of this application may be implemented through an analog and/or digital circuit implementing the embodiment of this application, or may be implemented through hardware or a combination of hardware and software that executes the logic of this embodiment of this application on an intelligent terminal.

In this embodiment of this application, the running circuitry 41, the drawing circuitry 42, the rendering circuitry 43, the input circuitry 44, and the logic control circuitry 45 that are in the apparatus may be all implemented by a central processing circuitry (CPU), a digital signal processor (DSP), a microcontroller circuitry (MCU), or a field-programmable gate array (FPGA) in actual application.

Figure 11:
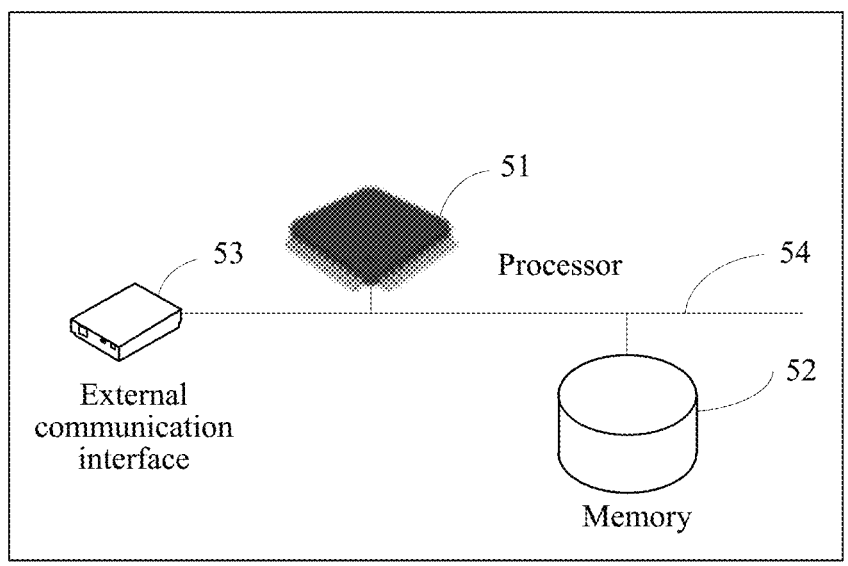
FIG. 11 is a schematic diagram of hardware composition of an information processing apparatus according to an embodiment of this application.

Based on the information processing apparatus shown in FIG. 9 or FIG. 10, an embodiment of this application further provides an information processing apparatus. FIG. 11 is a schematic diagram of hardware composition of an information processing apparatus according to an embodiment of this application. As shown in FIG. 11, the information processing apparatus includes a memory 52, a processor 51, and a computer program that is stored in the memory 52 and that can run on the processor 51. When executing the program, the processor 51 implements steps of the information processing method in this embodiment of this application. The information processing apparatus further includes an external communication interface 53. The processor 51, the memory 52, and the external communication interface 53 may all be connected through a bus 54. Specifically, when the processor 51 executes the program, the following is implemented: calling and loading a pre-obtained first data packet during execution of a running instruction of an application program; drawing a second image layer including a target object based on the loading of the first data packet during running of the application program and drawing of a first image layer corresponding to the application program, a specific display attribute being configured in areas other than the target object in the second image layer; rendering and outputting image data including the first image layer and the second image layer, the second image layer covering the first image layer; and if an operation is detected, when the operation is a first operation for the target object, generating and executing a first operation instruction based on the first data packet to control the target object to execute a corresponding action.

In an implementation, when the processor 51 executes the program, the following is implemented: when the operation is a second operation for a virtual object other than the target object, generating and executing a second operation instruction based on the application program to respond to the application program.

In an implementation, when the processor 51 executes the program, the following is implemented: obtaining at least one second user identity associated with a first user identity corresponding to the application program before the drawing a second image layer including a target object based on the loading of the first data packet; calling a specific interface to obtain target object data corresponding to the at least one second user identity; drawing a second image layer including a first target object and a second target object based on the loading of the first data packet and the target object data of the at least one second user identity, the first target object corresponding to the first user identity, and the second target object corresponding to the second user identity.

In an implementation, when the processor 51 executes the program, the following is implemented: obtaining location information of the operation, and obtaining relative location information of the target object; and calculating an offset distance between the location information and the relative location information, and determining that the operation is the first operation for the target object when the offset distance does not reach a preset threshold.

In this embodiment, the memory 52 may be implemented by any type of volatile or non-volatile storage device, or a combination thereof. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, or a compact disc read-only memory (CD-ROM), and the magnetic surface memory may be a magnetic disk memory or a magnetic tape memory. The volatile memory may be a random access memory (RAM), used as an external cache. Through exemplary but non-limitative descriptions, RAMs in lots of forms may be used, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a SyncLink dynamic random access memory (SLDRAM), and a direct rambus random access memory (DRRAM). The memory 52 described in this embodiment of this application aims to include but is not limited to these memories and any other suitable type of memory.

The processor 51 may be an integrated circuit chip, having a capability of processing a signal. In an implementation process, steps in the foregoing methods can be implemented by using a hardware integrated logical circuit in the processor 51, or by using instructions. The processor 51 may be a general purpose processor, a DSP, or another programmable logic device, discrete gate or transistor logic device, discrete hardware component, or the like. The processor 51 may implement or perform the methods, the steps, and logical block diagrams that are disclosed in the embodiments of this application. The general purpose processor may be a microprocessor or any conventional processor, or the like. Steps of the methods disclosed with reference to the embodiments of this application may be directly performed and completed by using a hardware decoding processor, or may be performed and completed by using hardware or a combination of hardware and logic in the decoding processor. The software logic may be located in the storage medium. The storage medium is located in the memory 52. The processor 51 reads information in the memory 52, and completes steps of the foregoing method in combination with hardware thereof.

In an exemplary embodiment, the information processing apparatus may be implemented by one or more application specific integrated circuits (ASICs), DSPs, programmable logic devices (PLDs), complex programmable logic devices (CPLDs), FPGAs, general purpose processors, controllers, MCUs, microprocessors, or other electronic elements, for executing the foregoing method.

Figure 12:
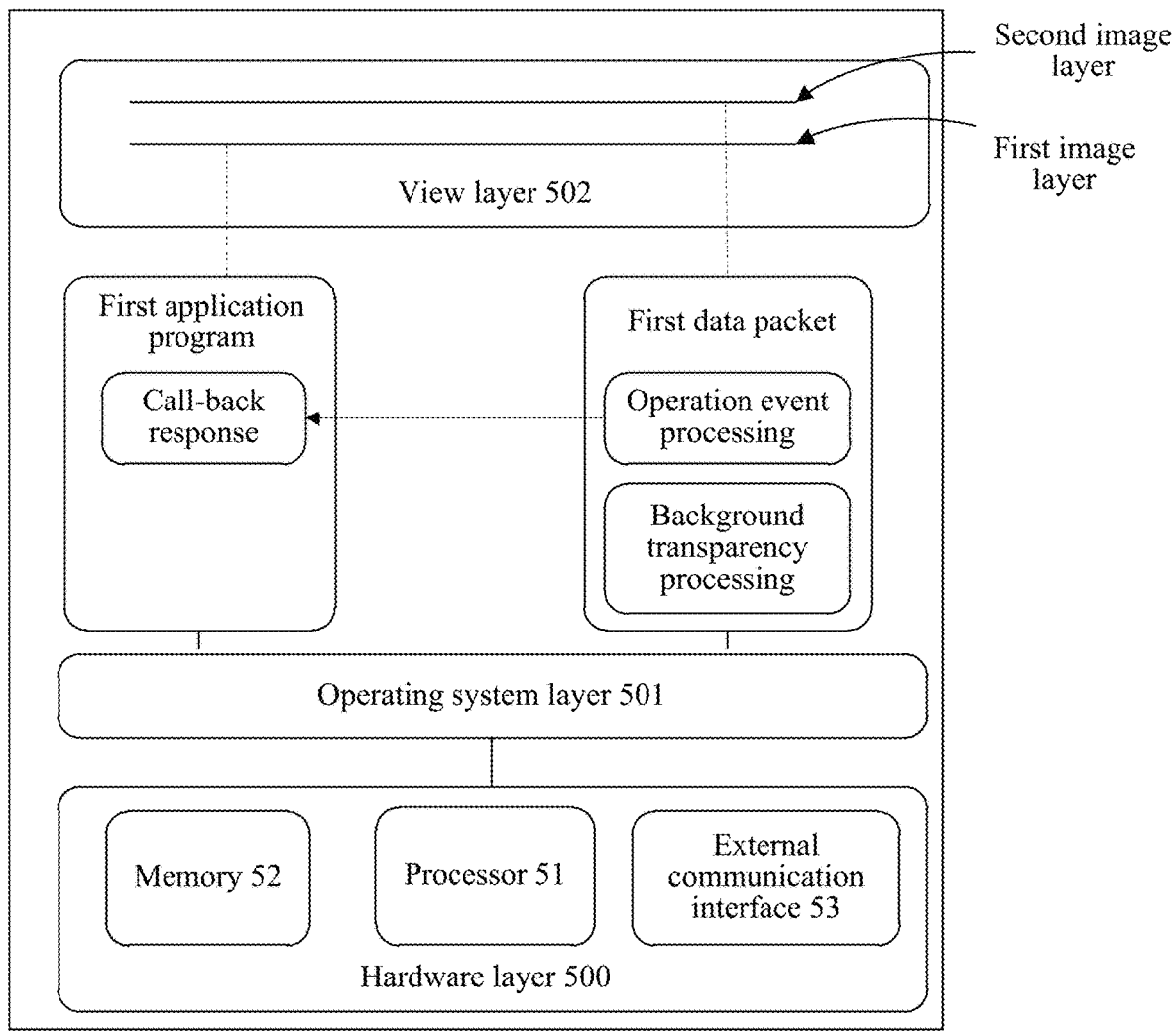
FIG. 12 is a schematic structural diagram of an information processing apparatus according to an embodiment of this application.

FIG. 12 is a schematic structural diagram of an information processing apparatus according to an embodiment of this application. As shown in FIG. 11 and FIG. 12, the apparatus includes a hardware layer 500, an operating system layer 501, an application program that runs based on the operating system layer, a first data packet, and a view layer 502. The hardware layer 500 may include the processor 51, the memory 52 and the external communication interface 53 that are shown in FIG. 11. Reference may be made to the descriptions of FIG. 11 for the processor 51, the memory 52, and the external communication interface 53, and details are not described herein again.

The operating system layer 501 includes various system programs, such as a framework layer, a kernel library layer, and a drive layer, for implementing various basic services and processing a task based on the hardware layer 500. In this embodiment of this application, use of an operating system of any type is not excluded, including a Linux kernel based operating system such as the Android system, and the IOS system and the Unix like system may also be included.

The application program is an application program that has a target object fusion requirement in this embodiment of this application, such as a map type application and a game type application. The first data packet is an SDK that includes target object data and that is pre-obtained from a network device (for example, a server to which a data store belongs). During running of the application program, the operating system calls and loads the first data packet. The display content loaded and drawn by the application program is carried through the first image layer in the view layer 502, and the target object drawn through loading of the first data packet is carried through the second image layer in the view layer 502.

In an implementation, when an operation is detected, an operation event processing function in the first data packet identifies whether the operation is an operation for the target object, if yes, generates a corresponding instruction to control the target object to execute a corresponding action, and if not, notifies the application program, so that a call-back response function of the application program makes a corresponding response according to the operation, to implement smooth communication between the application program and the first data packet. In another implementation, the operating system layer 501 detects the operation and identifies whether the operation is an operation for the target object; if yes, generates a corresponding event for notification to the first data packet, and the first data packet generates a corresponding instruction according to the corresponding event to control an action of the target object, and if not, generates a corresponding event for notification to the application program, and the application program generates a corresponding instruction according to the corresponding event to make a response. On the other hand, a background transparency processing function in the first data packet performs transparency processing on areas other than the target object in the second image layer, to implement seamless fusion between the target object and the display content of the application program.

Figure 13:
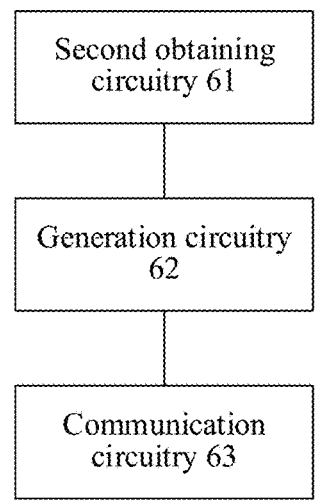
FIG. 13 is a third schematic structural diagram of an information processing apparatus according to an embodiment of this application.

An embodiment of this application further provides an information processing apparatus. FIG. 13 is a third schematic structural diagram of an information processing apparatus according to an embodiment of this application. As shown in FIG. 13, the apparatus includes: a second obtaining circuitry 61, a generation circuitry 62, and a communication circuitry 63.

The second obtaining circuitry 61 is configured to: obtain the target object data of the first format based on the plurality of element resources, and obtain the configuration information of the target object data, the first format being any file format supporting transmission of specific data.

The generation circuitry 62 is configured to generate a first data packet that meets a specific format based on the target object data and the configuration information obtained by the second obtaining circuitry 61.

The communication circuitry 63 is configured to send the first data packet generated by the generation circuitry 62 to the network device, so that the terminal device obtains the first data packet from the network device.

In this embodiment, the second obtaining circuitry 61 is configured to: obtain a plurality of preset standard element resources, the standard element resources meeting the first format; perform updating configuration on at least some of the plurality of standard element resources, to obtain a plurality of element resources meeting a requirement; and obtain target object data of the first format based on the plurality of element resources.

A person skilled in the art should understand that reference may be made to the related descriptions of the foregoing information processing method for operations of the circuitry in the information processing apparatus in this embodiment of this application. The circuitry in the information processing apparatus in this embodiment of this application may be implemented through an analog and/or digital circuit implementing the embodiment of this application, or may be implemented through hardware or a combination of hardware and software that executes the logic of this embodiment of this application on an intelligent terminal.

In this embodiment of this application, the second obtaining circuitry 61 and the generation circuitry 62 in the apparatus may be both implemented by the CPU, DSP, MCU, or FPGA in the terminal during actual application. The communication circuitry 63 in the apparatus may be implemented through a communication logic (including: a basic communication suite, an operating system, a communication logic, a standardized interface and protocol, and the like) and a transceiver antenna during actual application.

Based on the information processing apparatus shown in FIG. 13, this embodiment of this application further provides an information processing apparatus. Reference may be made to FIG. 11 for details of the information processing apparatus. The information processing apparatus includes a memory, a processor, and a computer program that is stored in the memory and that can run on the processor. When executing the program, the processor implements steps of the information processing method according to this embodiment of this application. Specifically, when the processor executes the program, the following is implemented: obtaining the target object data of the first format based on the plurality of element resources, and obtaining the configuration information of the target object data, the first format being any file format supporting transmission of specific data; and generating a first data packet meeting a specific format based on the target object data and the configuration information, and sending the first data packet to a network device, so that the terminal device obtains the first data packet from the network device.

In an implementation, when the processor executes the program, the following is implemented: obtaining a plurality of preset standard element resources, the standard element resources meeting the first format; performing updating configuration on at least some of the plurality of standard element resources, to obtain a plurality of element resources meeting a requirement; and obtaining target object data of the first format based on the plurality of element resources.

An embodiment of this application further provides a computer storage medium, storing a computer instruction. When the instruction is executed by a processor, steps of the information processing method in this embodiment of this application are implemented. Specifically, when the instruction is executed by the processor, the following is implemented: calling and loading a pre-obtained first data packet during execution of a running instruction of an application program; drawing a second image layer including a target object based on the loading of the first data packet during running of the application program and drawing of a first image layer corresponding to the application program, a specific display attribute being configured in areas other than the target object in the second image layer; rendering and outputting image data including the first image layer and the second image layer, the second image layer covering the first image layer; and if an operation is detected, when the operation is a first operation for the target object, generating and executing a first operation instruction based on the first data packet to control the target object to execute a corresponding action.

In an implementation, when the instruction is executed by the processor, the following is implemented: when the operation is a second operation for a virtual object other than the target object, generating and executing a second operation instruction based on the application program to respond to the application program.

In an implementation, when the instruction is executed by the processor, the following is implemented: obtaining at least one second user identity associated with a first user identity corresponding to the application program before the drawing a second image layer including a target object based on the loading of the first data packet; calling a specific interface to obtain target object data corresponding to the at least one second user identity; drawing a second image layer including a first target object and a second target object based on the loading of the first data packet and the target object data of the at least one second user identity, the first target object corresponding to the first user identity, and the second target object corresponding to the second user identity.

In an implementation, when the instruction is executed by the processor, the following is implemented: obtaining location information of the operation, and obtaining relative location information of the target object; and calculating an offset distance between the location information and the relative location information, and determining that the operation is the first operation for the target object when the offset distance does not reach a preset threshold.

An embodiment of this application further provides a computer storage medium, storing a computer instruction. When the instruction is executed by a processor, steps of the information processing method in this embodiment of this application are implemented. Specifically, when the instruction is executed by the processor, the following is implemented: obtaining the target object data of the first format based on the plurality of element resources, and obtaining the configuration information of the target object data, the first format being any file format supporting transmission of specific data; and generating a first data packet meeting a specific format based on the target object data and the configuration information, and sending the first data packet to a network device, so that the terminal device obtains the first data packet from the network device.

In an implementation, when the instruction is executed by the processor, the following is implemented obtaining a plurality of preset standard element resources, the standard element resources meeting the first format; performing updating configuration on at least some of the plurality of standard element resources, to obtain a plurality of element resources meeting a requirement; and obtaining target object data of the first format based on the plurality of element resources.

In the several embodiments provided in this application, it should be understood that the disclosed apparatus and method may be implemented in other manners. The described device embodiments are merely exemplary. For example, the circuitry division is merely logical function division and may be other division during actual implementation. For example, circuitry or components may be merged or integrated into another system, or some features may be ignored or not performed. In addition, the displayed or discussed mutual couplings or direct couplings or communication connections between the components may be implemented through some interfaces, indirect couplings or communication connections between the devices or circuitry, or electrical connections, mechanical connections, or connections in other forms.

The circuitry described as separation parts may be or may not be physically separated. The part used as display circuitry may be or may not be a physical circuitry. That is, the circuitry may be located in the same place, or may be distributed to many network circuitry. Some or all of the circuitry need to be selected according to actual requirements to implement the purpose of the solution of the embodiments.

In addition, functional circuitry in the embodiments of this application may be integrated into one processing circuitry, or each of the circuitry may exist alone physically, or two or more circuitry may be integrated into one circuitry. The integrated circuitry may be implemented in the form of hardware, or may be implemented in the form of hardware and logic.

Persons of ordinary skill in the art should understand that all or some of the steps of the method embodiment may be implemented by a program instructing relevant hardware. The program may be stored in a computer readable storage medium. When the program is run, the steps of the method embodiment are performed. The storage medium may be any medium that is capable of storing program code, such as a mobile storage device, a ROM, a RAM, a magnetic disk, and an optical disc.

Alternatively, when the integrated logic in this application is implemented in the form of circuitry and sold or used as an independent product, the integrated logic may be stored in a computer readable storage medium. Based on such an understanding, the technical solutions of the embodiments of this application essentially, or the part contributing to the prior art may be implemented in a form of a product. The computer product is stored in a storage medium and includes several instructions for instructing a computer device (which may be a personal computer, a server, a network device, or the like) to perform all or some of the methods described in the embodiments of this application. The foregoing storage medium includes: any medium that can store program code, such as a mobile storage device, a ROM, a magnetic disk, or an optical disc.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method comprising:
   obtaining, by a processor, target object data of a target object, the target object data formatted based on a first format, the target object data comprising a plurality of element resources for a three dimensional model, the first format for transmission of three-dimensional model data;
   obtaining, by the processor, configuration information associated with the target object data;
   generating, by the processor, a data packet of a second format based on the target object data and the configuration information;
   encapsulating rendering instructions in the data packet, wherein the rendering instructions are configured to cause a terminal device to:
   in response to a call instruction for the data packet, obtain a rendering parameter from the call instruction, render an image layer comprising the target object, and set an attribute value of the target object in the image layer to a value in the rendering parameter; and
   providing, by the processor, the data packet to the terminal device.

2. The method of claim 1, further comprising:
   including interaction instructions in the data packet, wherein
   the interaction instructions are configured to cause the terminal device to:
   detect an operation event corresponding to the target object rendered in the image layer;
   in response to detection of the operation event, obtain an operation parameter of the operation event, the operation parameter indicative of movement of the target object, and
   cause the target object to move in the image layer based on the operation parameter.

3. The method of claim 1, wherein providing the data packet to the terminal device further comprises:
   sending the data packet to a network device configured to communicate the data packet to the terminal device.

4. The method of claim 1, wherein obtaining the target object data formatted based on the first format comprises:
   obtaining a plurality of predetermined element resources, the predetermined element resources associated with the first format;
   receiving an update configuration for at least one of the predetermined element resources, the update configuration indicative of modification to at least one of the predetermined element resources;
   updating the at least one of the predetermined element resources to obtain a modified element resource based on the update configuration; and
   obtaining the target object data of the first format based on the modified element resource.

5. The method of claim 4, wherein updating the at least one of the predetermined element resources to obtain the modified element resource comprises:
   modifying an attribute of the at least one of the predetermined element resources, the attribute comprising size, color shape, or any combination thereof.

6. The method of claim 1, wherein the target object comprises an avatar object and the plurality of element resources are representative of a body, articles of clothing, wearable accessories, or any combination thereof.

7. A non-transitory computer readable storage medium comprising:
   a plurality of instructions, the plurality of instructions executable by a processor to:
   obtain target object data of a target object, the target object data formatted based on a first format, the target object data comprising a plurality of element resources for a three dimensional model, the first format for transmission of three-dimensional model data;
   obtain configuration information associated with the target object data;
   generate a data packet of a second format based on the target object data and the configuration information;
   include interaction instructions in the data packet, wherein the interaction instructions are configured to cause a terminal device to:
   detect an operation event for the target object rendered in an image layer;
   in response to detection of the operation event, obtain an operation parameter of the operation event, the operation parameter indicative of movement of the target object, and
   cause the target object to move in the image layer based on the operation parameter; and
   provide the data packet to the terminal device.

8. The non-transitory computer readable storage medium of claim 7, wherein the plurality of instructions is further executable by the processor to:
   encapsulate rendering instructions in the data packet, wherein the rendering instructions are configured to cause the terminal device to:
   in response to a call instruction,
   obtain a rendering parameter from the call instruction, render an image layer comprising the target object, and set an attribute value of the target object in the image layer to a value in the rendering parameter.

9. The non-transitory computer readable storage medium of claim 7, wherein the plurality of instructions is further executable by the processor to:
   send the data packet to a network device configured to communicate the data packet to the terminal device.

10. The non-transitory computer readable storage medium of claim 7, wherein the plurality of instructions, to obtain the target object data formatted based on the first format, is executable by the processor to:
obtain a plurality of predetermined element resources, the predetermined element resources associated with the first format;
receive an update configuration for at least one of the predetermined element resources, the update configuration indicative of modification to at least one of the predetermined element resources;
update the at least one of the predetermined element resources to obtain a modified element resource based on the update configuration; and
obtain the target object data of the first format based on the modified element resource.

11. The non-transitory computer readable storage medium of claim 7, wherein the target object comprises an avatar object and the plurality of element resources are representative of a body, articles of clothing, wearable accessories, or any combination thereof.

12. An apparatus comprising:
a memory;
a processor configured to execute a plurality of computer readable instructions stored in the memory to:
obtain target object data of a target object, the target object data formatted based on a first format, the target object data comprising a plurality of element resources for a three dimensional model, the first format for transmission of three-dimensional model data;
obtain configuration information associated with the target object data;
generate a data packet of a second format based on the target object data and the configuration information;
encapsulate rendering instructions in the data packet, wherein the rendering instructions are configured to cause a terminal device to:
in response to a call instruction for the data packet, obtain a rendering parameter from the call instruction,
render an image layer comprising the target object, and
set an attribute value of the target object in the image layer to a value in the rendering parameter; and
provide the data packet to the terminal device.

13. The apparatus of claim 12, wherein the processor is configured to further execute the plurality of computer readable instructions stored in the memory to:
include interaction instructions in the data packet, wherein
the interaction instructions are configured to cause the terminal device to:
detect an operation event corresponding to the target object rendered in the image layer;
in response to detection of the operation event, obtain an operation parameter of the operation event, the operation parameter indicative of movement of the target object, and
cause the target object to move in the image layer based on the operation parameter.

14. The apparatus of claim 12, wherein in order to provide the data packet to the terminal device, the processor is configured to execute the plurality of computer readable instructions stored in the memory to:
send the data packet to a network device configured to communicate the data packet to the terminal device.

15. The apparatus of claim 12, wherein in order to obtain the target object data formatted based on the first format, the processor is configured to execute the plurality of computer readable instructions to:
obtain a plurality of predetermined element resources, the predetermined element resources associated with the first format;
receive an update configuration for at least one of the predetermined element resources, the update configuration indicative of modification to at least one of the predetermined element resources;
update the at least one of the predetermined element resources to obtain a modified element resource based on the update configuration; and
obtain the target object data of the first format based on the modified element resource.

16. The apparatus of claim 15, wherein to update the at least one of the predetermined element resources to obtain the modified element resource, the processor is configured to execute the plurality of computer readable instructions to:
modify an attribute of the at least one of the predetermined element resources, the attribute comprising size, color, or any combination thereof.

17. The apparatus of claim 12, wherein the target object comprises an avatar object and the plurality of element resources are representative of a body, articles of clothing, wearable accessories, or any combination thereof.

* * * * *